June 5, 1962     C. W. SHIPLEY ETAL     3,037,592

CRISSCROSS CORE FOR LAMINATED METAL STRUCTURES

Filed Aug. 23, 1957     2 Sheets-Sheet 1

*INVENTOR.*
CHARLES W. SHIPLEY
BY CHESTER W. LAWRENCE
MICHAEL E. WASILISIN

ATTORNEY

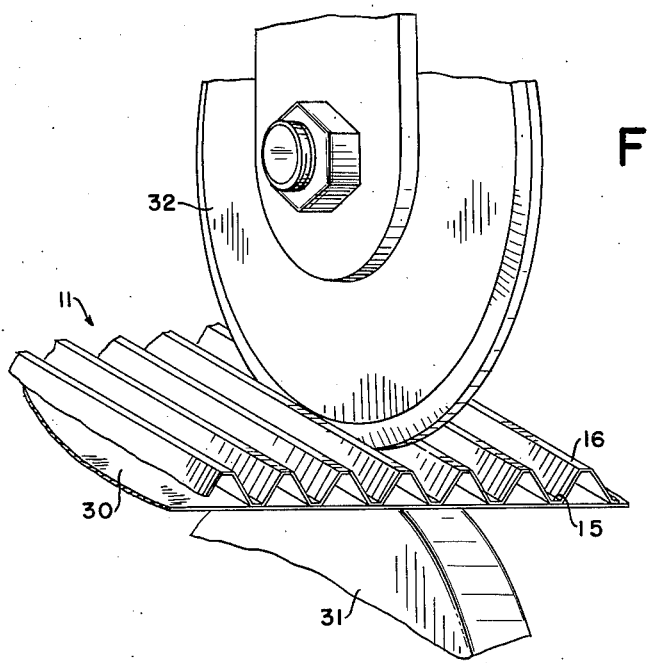
FIG. 8
FIG. 6
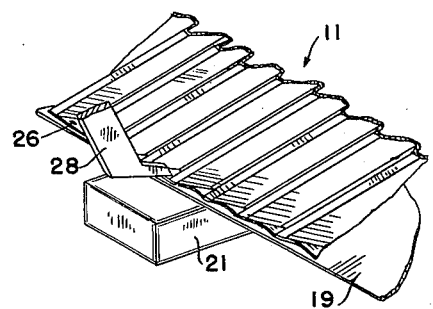
FIG. 4
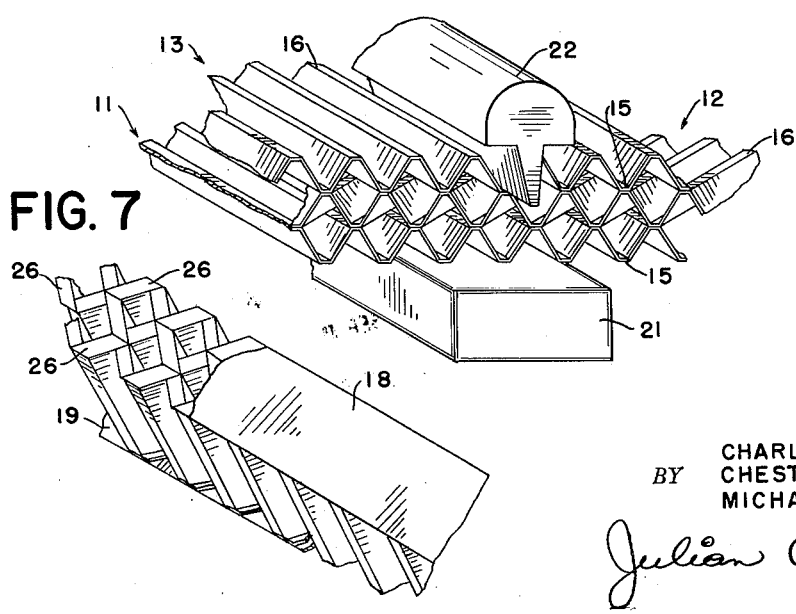
FIG. 7
INVENTOR.
CHARLES W. SHIPLEY
BY CHESTER W. LAWRENCE
MICHAEL E. WASILISIN
ATTORNEY

United States Patent Office 3,037,592
Patented June 5, 1962

3,037,592
CRISSCROSS CORE FOR LAMINATED METAL STRUCTURES
Charles W. Shipley, Baltimore, and Chester W. Lawrence and Michael E. Wasilisin, Essex, Md., assignors to Martin-Marietta Corporation, a corporation of Maryland
Filed Aug. 23, 1957, Ser. No. 679,830
6 Claims. (Cl. 189—34)

This invention relates to laminated metal structures comprising a top and bottom skin of sheet metal separated by a light weight core of the metal, and in particular to an improved core for such structures.

The structural requirements of modern aircraft with regard to high strength, light weight and resistance to the effects of high temperatures and corrosive gases have led to the development of laminated metal structures fabricated from aluminum alloys and from such corrosion-resistant metals as stainless steels, nickel alloys and titanium alloys. These laminated metal structures are employed in the construction of aircraft wings and other airframe components and comprise a top and bottom skin of the metal separated from but connected to each other by an intermediate honeycomb core of the metal to which the top and bottom skins are secured by brazing or some equivalent fastening technique. The honeycomb core of these laminated structures comprises a plurality of mutually contacting honeycomb elements each of which is formed from metal sheet or foil and has a zig-zag or corrugated configuration such that the contacting elements will define between them a plurality of honeycomb cells. The corrugations of each honeycomb element are parallel to each other and are disposed at right angles to the length or longitudinal axis of the element so that when a large number of these elements are assembled together with the peaks of the corrugations of one element contacting the valleys of the corrugations of the adjoining honeycomb element, the elements between them define a plurality of individual, vertically disposed, four-sided honeycomb cells which extend from the top skin to the bottom skin of the honeycomb structure. That is to say, if the top and bottom skins of the honeycomb structure are approximately horizontally disposed (as would be the case if the skins formed the upper and lower surfaces of an aircraft wing) the corrugations of the honeycomb elements of the core, and the resulting individual honeycomb cells, extend vertically between the top and bottom skins so that the axis of each of these corrugations is at an angle of 90° to the horizontal axis (which in the assumed case corresponds to the longitudinal axis) of the honeycomb core.

The aforementioned honeycomb structure is remarkably resistant to bending, compressive and similar forces for an object so light in weight, and if constructed of the aforementioned corrosion-resistant metals it retains its high strength at relatively high temperatures as compared with conventional methods and materials of construction employed in aircraft manufacture. However, a serious disadvantage inherent in this honeycomb structure is that it is difficult to securely fasten the inner surfaces of the top and bottom skins of the honeycomb structure to the honeycomb core due to the fact that the actual area of contact between the inner surfaces of the skins and the contacting edges of the elements of the honeycomb core is very small. Moreover, a further serious disadvantage of this honeycomb structure is that airplane wings employing this construction cannot be used to store liquid fuel as can wings of conventional prior construction due to the fact that the interior of the wing is entirely filled with the individual honeycomb cells of the core. Inasmuch as communication between the individual cells of the core is exceedingly limited or non-existent, it is impractical to attempt to introduce liquid fuel into and withdraw liquid fuel from the cells of this type of honeycomb core.

To overcome the aforementioned disadvantages of conventional honeycomb core construction, we have devised a novel core for laminated metal structures of the type described which employs a crisscross core in place of the aforementioned honeycomb core. The crisscross core of our new laminated metal structure can be readily secured to the inner surfaces of the top and bottom skins of the structure by simple resistance welding or brazing or other equivalent fastening techniques, and due to the fact that the core structure is not composed of a number of individual cells each one isolated from the others, the crisscross core of our invention can be readily adapted to store liquid fuels in the spaces between the several core elements that make up the core. Moreover, our crisscross core possesses even greater resistance to deformation under certain compressive forces than the aforementioned prior art honeycomb core.

The crisscross core of our invention comprises a plurality of corrugated core elements assembled side-by-side in parallel alignment with the peaks of the corrugations of each element in contact with and secured to the valleys of the corrugations of adjoining core elements. The corrugations of each core element are parallel to each other and are disposed at an angle of about 45° to the longitudinal axis of the core element, and the corrugations of adjoining core elements are disposed in opposite directions with respect to their respective longitudinal axes so that the corrugations of one of said adjoining core elements cross the corrugations of the other of said elements at an angle of about 90°. The corrugations of all elements have flattened portions at the peaks and valleys thereof parallel to the plane of the element so that a substantial area of contact exists between adjoining core elements where the flattened peak portions of the corrugations of one of said elements cross over and contact the flattened valley portions of the corrugations of the adjoining core element. The crisscross core is incorporated in a laminated metal structure of the type hereinbefore described by welding or brazing the upper and lower edges of the core to the inner surfaces of the top and bottom skins, respectively, of the laminated structure. Adhesive bonding may also be employed to secure the core to the skins.

Our improved core structure, and the laminated metal structure made therefrom, will be better understood from the following description thereof taken in conjunction with the accompanying drawings of which FIG. 1 is a side elevation of a fragment of our crisscross core with portions of two of the core elements broken away to show the crisscross construction of the core;

FIG. 4 shows a method of resistance welding the flattened peak portions of one core element to the flattened valley portions of an adjoining core element of an assembly of core elements;

FIG. 6 shows a method of resistance welding the flattened edge portions of a core element such as that shown in FIG. 5 to the inner surface of a skin of the metal;

FIG. 7 is a perspective view showing top and bottom metal skins secured to a crisscross core formed from three core elements the edges of which are flattened in the manner shown in FIG. 5; and FIG. 8 shows a method of resistance welding the flattened valleys of a core element to the inner surface of a metal skin.

Figure 1:
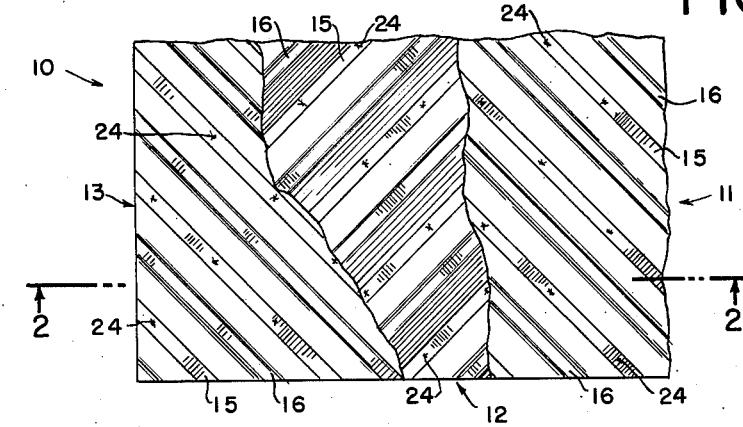
Figure 3:
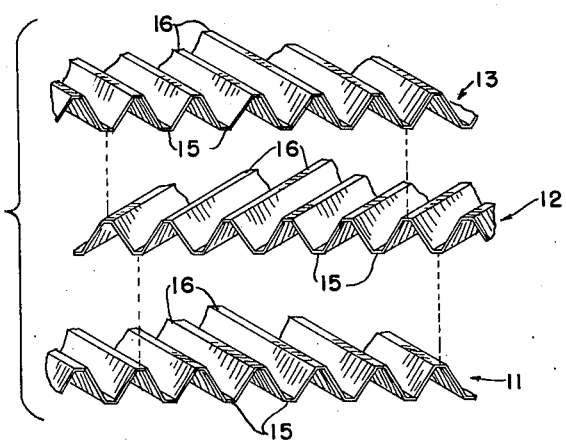
FIG. 3 is an exploded perspective view of a portion of a crisscross core.
Figure 2:
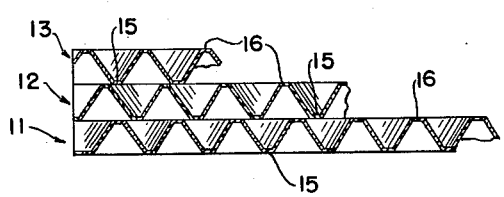
FIG. 2 is a section taken along lines 2—2 of FIG. 1.

As shown best in FIGS. 1 through 3 of the drawing, the crisscross core 10 of our invention comprises a number of corrugated core elements 11, 12, 13, etc. assembled side by side with the planes of all the core elements parallel to one another so that the valleys 15 of the corrugations of each of the core elements are in contact with the peaks or crests 16 of the corrugations of the adjoining core elements. Our new crisscross core 10 is employed as the intermediate layer of a metal laminate or sandwich, such as that shown in FIG. 7, which comprises a top skin 18 of sheet metal, the crisscross core composed of the aforementioned core elements, and a bottom skin 19 of sheet metal. The metal from which the skins and core of the laminate are made must be one suitable for the ultimate use to which the laminated structure will be put. For example, in aircraft manufacture the laminated structure is advantageously fabricated from aluminum alloys, or with particular advantage from such corrosion-resistant metals as stainless steel, nickel alloys or titanium alloys. The thickness of the sheet metal from which the metal skins and core elements are fabricated is not critical; however, by way of example, the skins are advantageously sheet metal of the order of about 0.01 to 0.10 inch thick and the core elements are advantageously fabricated from metal foil of the order of about 0.001 to 0.010 inch thick.

The metal foil from which the core elements 11, 12, 13, etc. of the core 10 are fabricated is advantageously first given a "rigidizing" treatment by passing the foil through a pair of metal rolls the surfaces of which are formed with a plurality of small, closely spaced, circumferential ridges and grooves which, in turn, form corresponding ridges and grooves in the upper and lower surfaces of the foil passed therebetween. The resulting rigidized foil is then stamped or rolled in an appropriate machine to form a plurality of parallel, generally V-shaped corrugations therein. The V-shaped corrugations have flattened valley portions 15 and flattened peak portions 16 which are parallel to the plane of the core element, and the corrugations are disposed at an angle of approximately 45° of the longitudinal axis of the core element. The longitudinal axis of the core element extends lengthwise through the core element midway between and parallel to the top and bottom edges of the core and midway between the peaks and valleys of the corrugations. In this connection, it should be noted that, as these terms are employed herein, the height of each corrugated core element is determined by the distance which is to separate the inner surfaces of the two skins of the laminate, the length of the core element is determined by the corresponding dimension of the crisscross core of which the element becomes a part, and the depth or thickness of the element is determined by the depth, from peak to valley, of the corrugations thereof.

The crisscross core 10 of our invention is constructed by assembling and securing together a large number of the said core elements as shown in FIGS. 1, 2 and 3. The core elements 11, 12, 13, etc. are assembled side by side as shown with the planes of the several elements parallel to each other and with the corrugations of adjoining elements disposed in opposite directions with respect to their respective longitudinal axes so that the corrugations of one of the adjoining core elements (for example, core element 12) cross the corrugations of the next adjoining core elements (i.e. core elements 11 and 13) at an angle of about 90°. The flattened portions of the peaks 16 and valleys 15 of the corrugations of adjoining core elements provide a relatively large area of mutual contact between these core elements so that the said elements can be securely fastened together by means of welding or brazing or other suitable fastening techniques such as adhesive bonding. In this connection we have found that if the core elements do not have the aforementioned flattened portions at the peaks and valleys of the corrugations thereof, the area of contact between adjoining core elements is too small to provide for securely fastening the two core elements together.

In joining the several core elements together by means of resistance welding, one electrode of a welding machine is connected to one of the core elements (or to a previously welded assembly of core elements), and then a second core element is accurately positioned over the said first core element (or assembly of core elements) and is welded thereto by applying the other electrode of the welding machine firmly against the flattened valley portions 15 of the corrugations of the second core element where these corrugations cross over and contact the flattened peak portions 16 of the underlying first core element. A crisscross core such as that shown in FIGS. 1 and 3 is thus built up by adding one core element at a time to the core assembly, each new core element added thereto being individually welded to the adjoining core element which in turn has been previously individually welded to the next preceding core element.

The specific welding technique employed depends on the material of construction used and the welding equipment available. We have found it particularly advantageous to employ the arrangement of welding electrodes shown in FIG. 4 comprising a flat anvil-type lower electrode 21 and a special wedge-shaped upper electrode 22 adapted to fit into the V-shaped corrugations of the core elements. With this arrangement the first core element (or, as is the case in FIG. 4, an assembly of previously welded core elements 11 and 12) is supported by the lower electrode 21 of the welding machine. The core element 13 being added to the aforementioned assembly of core elements is then carefully positioned thereover, and the upper electrode 22 is inserted in turn into each of the corrugations of the upper core element 13 and is firmly pressed against the flattened valley portions 15 thereof so that the said valley portions of the upper core element 13 will be welded to the flattened peak portions 16 of the underlying core element 12 where the corrugations of the two core elements 12 and 13 cross and come into contact with one another. The points where the corrugations of the upper core element cross over and contact the corrugations of the underlying core element and are welded thereto are indicated by the spot welds 24 shown best in FIG. 1.

Another satisfactory technique for welding the various core elements of the crisscross core together is a modification of the method for seam welding ferrous alloy honeycomb cores described in U.S. Patent 2,780,716 to Wasilisin and Wernz. In this procedure a number of wedge-shaped copper bars, the cross-section of each of which corresponds to the V-shaped corrugations formed in each of the core elements, are disposed beneath and within the corrugations of the core element to which the new core element is to be added by welding. The flattened peak portions of the corrugations of the lower core element are thus supported throughout their length by the said wedge-shaped copper bars. These copper bars serve as the lower electrode of the welding machine so that when the said new core element is positioned over the lower core element and the upper welding electrode of the welding machine is inserted in and pressed against the valley portions of the corrugations of the upper core elements, the flattened peak portions 16 of the underlying core element and the flattened valley 15 portions of the overlying core element will be firmly pressed and securely welded together at the points where these corrugations cross and contact one another.

Figure 5:
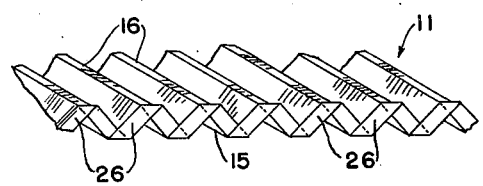
FIG. 5 is a perspective view of one core element showing the folding over and flattening of one edge of the element to provide a flat surface by means of which the element can be fastened to the inner surface of a skin of the laminated metal structure.

After a sufficient number of core elements have been welded together to form a crisscross core of the desired dimensions, the aforementioned top and bottom skins 18 and 19 are advantageously applied thereto by welding or brazing techniques to form the desired laminated metal structure. As pointed out hereinbefore, one of the chief disadvantages of the prior art honeycomb structures is the difficulty experienced in securely fastening the inner surfaces of the top and bottom skins thereof to the edges of the foil sections that make up the honeycomb core. One of the important advantages of the crisscross core construction of our invention is that, as shown in FIG. 5, the longitudinal edges of the individual core elements can be readily folded over to form flat surfaces 26 that, in turn, can be readily welded or brazed to the top and bottom skins of the laminate. The individual core element 11 shown in FIG. 5, the edges of which are folded over to form the aforementioned flat portions 26, is advantageously welded to the inner surfaces of the said skins by means of the resistance welding technique shown in FIG. 6. In this procedure, the skin 19 is supported by the lower electrode 21, and the flattened portions 26 of the core element 11 are welded to the inner surface of the said skin by means of the offset upper electrode 28. A second skin 18 (not shown in FIG. 6) can be welded in precisely the same manner to similar flattened portions 26 formed on the opposite longitudinal edge of the core element 11. Additional core elements 12, 13, etc., all of which have been formed with said flattened edge portions 26, are then welded to the skins 18 and 19 by means of the welding technique shown in FIG. 6, and are welded to adjoining core elements by means of the welding technique shown in FIG. 4 to form the laminated metal structure shown in part in FIG. 7.

In a modification of our laminated structure, it is sometimes desirable to apply the outer skins to the sides of the core assembly rather than to the upper and lower edges thereof. In this construction a core element 11 is resistance welded to one of the skins 30 by means of the circular electrodes 31 and 32 shown in FIG. 8. Any desired number of additional core elements are then resistance welded to the first core element, for example in the manner shown in FIG. 4, to build up an assembly of the desired dimensions. If it is desired to have another skin (not shown in FIG. 8) on the opposite side of the assembly, the last core element resistance welded to the aforementioned assembly is one to which the second skin has already been resistance welded in the same manner as that shown in FIG. 8.

From the foregoing description of our invention it will be seen that we have devised an important improvement in the construction of laminated metal structures of the type hereinbefore described. One of the great disadvantages of the laminated "honeycomb" structure of the prior art is that it is difficult to securely fasten the honeycomb core to the inner surfaces of the top and bottom skins of the laminated structure. Moreover, it is almost impossible to utilize the empty spaces within the prior art honeycomb core for the purpose of liquid fuel storage because of the difficulty of introducing fuel into and withdrawing the fuel from the large number of individually isolated honeycomb cells which fill the interior space of this core. In contrast to this, the criss-cross core construction of our invention can be readily secured to the exterior skins of the laminated structure, and can be readily employed for liquid fuel storage due to the fact that the longitudinal space between each pair of adjoining core elements is in free communication throughout the entire space by virtue of the crisscrossing corrugations of the core elements. To adapt a laminated structure embodying the crisscross core of our invention for a fuel storage space all that it is necessary to do is to provide lateral communication between all of the aforementioned longitudinally disposed spaces located between each pair of adjoining core elements.

We claim:

1. A crisscross core for laminated metal fluid containing tank structures comprising at least three corrugated metal core elements assembled side-by-side in parallel alignment with the peaks of the corrugations of each core element in contact with and welded to the valleys of the corrugations of adjoining core elements, said core elements being constructed of metal foil of the order of about 0.001 to 0.010 inch thick, and being of increased rigidity by virtue of their surfaces having been impressed with a plurality of small, closely spaced circumferential ridges and grooves, the corrugations of each core element being parallel to each other and disposed at an angle of about 45° to the longitudinal axis of said core element, the corrugations of adjoining core elements being disposed in opposite directions with respect to their said longitudinal axes whereby the corrugations of one of said adjoining core elements cross the corrugations of the other of said core elements at an angle of about 90°, all of said corrugations having flattened portions at the peaks and at the valleys thereof parallel to the plane of the core element whereby a substantial area of contact exists between adjoining core elements at the points where the flattened peaks of the corrugations of one of said elements cross over and contact the flattened valley portions of the corrugations of the adjoining core element, the upper and lower edge portions of each of said core elements being folded over in the same direction as the adjacent corrugations of the element are disposed to form flattened edge portions disposed generally perpendicular to the plane of said element, said flattened edge portions being welded to the inner surfaces of the outer skins of said laminated structure.

2. A laminated tank structure comprising a metal top skin and a metal bottom skin disposed in spaced relation and interconnected by a crisscross metal core, said core comprising a plurality of corrugated metal core elements assembled side-by-side in parallel alignment with the peaks of the corrugations of each core element in contact with and welded to the valleys of the corrugations of adjoining core elements, said core elements being constructed of metal foil of the order of about 0.001 to 0.010 inch thick, the corrugations of each core element being parallel to each other and disposed at an angle of about 45° to the longitudinal axis of said core element, the corrugations of adjoining core elements being disposed in opposite directions with respect to their said longitudinal axes whereby the corrugations of one of said adjoining core elements cross the corrugations of the other of said core elements at an angle of about 90°, all of said corrugations being generally V-shaped and having flattened portions at the peaks and at the valleys thereof parallel to the plane of the core element whereby a substantial area of contact exists between adjoining core elements at the points where the flattened peaks of the corrugations of one of said elements cross over and contact the flattened valley portions of the corrugations of the adjoining core element the upper and lower edge portions of each said core elements being folded over in the same direction as the adjacent corrugations of the element are disposed to form flattened edge portions disposed generally perpendicular to the plane of said element, said flattened edge portions being welded to the inner surfaces of the outer skins of said laminated tank structure, each pair of adjoining core elements defining a longitudinally disposed space therebetween, all of the said longitudinally disposed spaces lying between said pairs of adjoining core elements being in lateral communication with each other, whereby said core can function as a portion of a tank for liquid, such as fuel.

3. A tank arrangement for an aircraft wing structure comprising upper and lower skins defining the external configuration of the wing, and being spaced apart to define a liquid-containing tank disposed generally along the longitudinal axis of said wing, and crisscross honeycomb structural material disposed between said skins to provide substantial rigidity to said wing, said crisscross honeycomb material comprising a plurality of corrugated metal elements assembled side by side in opposite angular relation, a portion of the peaks of the corrugations of each said elements being in contact with and welded to a portion of the peaks of the corrugations of adjoining elements, all of said corrugations being generally V-shaped and having flattened portions at the peaks and at the valleys thereof parallel to the plane of said element whereby a substantial area of contact exists between adjoining elements at the points where the flattened peaks of the corrugations of one of said elements cross over and contact the flattened valley portions of the corrugations of the adjoining elements, each element being disposed with its corrugations residing at an angle of about 45° to the plane of said honeycomb material, the corrugations of adjoining elements being disposed in opposite directions at an angle of about 45° to said plane, whereby the corrugations of one of said adjoining elements cross the corrugations of the other of said elements at an angle of about 90°, each pair of elements so joined defining a space therebetween, all of said spaces lying between said pair of adjoining elements being in lateral communication with each other, the upper and lower edge portions of each of said elements being folded over in the same direction as the adjacent corrugations thereof are disposed, said flattened edge portions of each of said elements being welded to the inner surfaces of said upper and said lower wing skins.

4. A laminated structure comprising a first and second skin, and a crisscross core interposed therebetween, said crisscross core being secured to said first and second skins and comprising a plurality of corrugated core elements assembled side by side with the plane of each element parallel to the plane of adjoining elements and with the peaks of the corrugations of each element in contact with and secured to the valleys of the corrugations of the adjoining elements, the corrugations of each element being disposed at an angle of about 45° to the longitudinal axis of said element, the corrugations of adjoining core elements being disposed in opposite directions with respect to the longitudinal axes of said elements whereby the corrugations of one of said adjoining elements cross over the corrugations of the other of said adjoining elements at an angle of about 90°, each corrugation having flattened portions at the peak and at the valley thereof disposed parallel to the plane of said element whereby the flattened peak portions of the corrugations of each core element cross over and contact a substantial area of the flattened valley portions of the adjoining elements, the planes of said first and second skins being positioned substantially normal to the planes of said core elements and on opposite edges of said crisscross core.

5. The laminated structure as recited in claim 4 wherein the peaks of the corrugations of each of said core elements are secured to the valleys of the corrugations of adjoining elements by brazing, and wherein said crisscross core is secured to said first and second skins by brazing.

6. The laminated structure as recited in claim 4 wherein the peaks of the corrugations of each of said core elements are secured to the valleys of the corrugations of adjoining elements by welding, and wherein said crisscross core is secured to said first and second skins by welding.

References Cited in the file of this patent

UNITED STATES PATENTS

| | | |
|---|---|---|
| 1,761,037 | Gross | June 3, 1930 |
| 2,644,777 | Havens | July 7, 1953 |
| 2,910,153 | Campbell | Oct. 27, 1959 |

FOREIGN PATENTS

| | | |
|---|---|---|
| 88,736 | Sweden | Mar. 9, 1937 |